(12) United States Patent
Taha (10) Patent No.: US 7,545,811 B2
(45) Date of Patent: Jun. 9, 2009

(54) EFFICIENT BROADCAST IN WIRELESS MESH NETWORKS

(75) Inventor: Samer M. Taha, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 11/271,538

(22) Filed: Nov. 9, 2005

(65) Prior Publication Data

US 2007/0104199 A1 May 10, 2007

(51) Int. Cl.
H04L 12/28 (2006.01)

(52) U.S. Cl. .................................................. 370/392

(58) Field of Classification Search ................. 370/270, 370/312, 313, 389, 390, 392, 393, 432
See application file for complete search history.

(56) References Cited

U.S. PATENT DOCUMENTS

| | | | |
|---|---|---|---|
| 2004/0172466 A1* | 9/2004 | Douglas et al. | 709/224 |
| 2005/0079858 A1 | 4/2005 | Rosen et al. | |
| 2005/0180447 A1 | 8/2005 | Lim et al. | |
| 2006/0262758 A1* | 11/2006 | Sandhu et al. | 370/338 |

FOREIGN PATENT DOCUMENTS

EP 0 871 309 A2 10/1998
EP 0 913 965 A 5/1999

OTHER PUBLICATIONS

IEEE 802.11, 1999 Edition, Reaffirmed Jun. 12, 2003, Section 7, pp. 34-58.*
Mingkhwan A et al:, "Mutli hop communication in global wireless framework", Wireless Communications and Networking, 2003. 2003 IEEE Mar. 16-20, 2003, Piscataway, NJ, USA, IEEE, vol. 2, Mar. 16, 2003, pp. 1011-1016, XP010639906.
Sang Ho Bae et al., "The Design, Implementation, and Performance Evaluation of the On-Demand Multicast Routing Protocol in Multishop Wireless Networks", IEEE Network, IEEE Service Center, New York, NY, US, vol. 14, No. 1, Jan. 2000, pp. 70-77, XP001195291.
PCT, Internation Search Report and Written Opinion of the International searching Authority, Application No. PCT/US2006/043643 mailed Mar. 19, 2007.

* cited by examiner

Primary Examiner—Chirag G Shah
Assistant Examiner—Yong Zhou
(74) Attorney, Agent, or Firm—Stuart A. Whittington (57) ABSTRACT

A method, apparatus and system for communicating in a wireless mesh network may entail receiving a multi-receiver single body broadcast (MRSSB) medium access control (MAC) frame at a mesh node. The MAC frame may include a multiple receiver address field, a previously addressed neighbor field and a message sequence number field, which may be used by the receiving node to know whether it has already received this frame and if not, generate a forwarding frame to forward the data of the received frame but addressed to neighboring nodes except for those which are likely to have previously received the message already. Various embodiments and implementations are also disclosed.

20 Claims, 5 Drawing Sheets

EFFICIENT BROADCAST IN WIRELESS MESH NETWORKS

BACKGROUND OF THE INVENTION

It is becoming increasingly attractive to use nodes in a wireless network as relaying points to extend range and/or increase power efficiency of wireless transmissions. For example, in a wireless local area network (WLAN), network devices may be configured to receive and forward communications which are ultimately destined for a different device. These types of networks are colloquially referred to as mesh networks, where network nodes may form a "mesh" of paths for which a communication may travel to reach its destination.

There is an ongoing effort to increase the efficiency of transmissions through a wireless mesh network.

BRIEF DESCRIPTION OF THE DRAWING

Aspects, features and advantages of embodiments of the present invention will become apparent from the following description of the invention in reference to the appended drawing in which like numerals denote like elements and in which.

DETAILED DESCRIPTION OF THE INVENTION

While the following detailed description may describe example embodiments of the present invention in relation to WLANs, the invention is not limited thereto and can be applied to other types of wireless networks where similar advantages may be obtained. Such networks for which inventive embodiments may be applicable specifically include, wireless personal area networks (WPANs), wireless metropolitan area networks (WMANs), and/or wireless wide area networks (WWANs) such as cellular networks and the like. Further, inventive embodiments may be discussed in reference to wireless networks utilizing Orthogonal Frequency Division Multiplexing (OFDM) modulation. However, the embodiments of present invention are not limited thereto and, for example, can be implemented using other modulation and/or coding schemes where suitably applicable.

The following inventive embodiments may be used in a variety of applications including transmitters and receivers of a radio system. Radio systems specifically included within the scope of the present invention include, but are not limited to, network interface cards (NICs), network adaptors, mobile stations, base stations, access points (APs), gateways, bridges, hubs and routers. Further, the radio systems within the scope of the invention may include cellular radiotelephone systems, satellite systems, personal communication systems (PCS), two-way radio systems and two-way pagers as well as computing devices including radio systems such as personal computers (PCs) and related peripherals, personal digital assistants (PDAs), personal computing accessories and all existing and future arising systems which may be related in nature and to which the principles of the inventive embodiments could be suitably applied.

Figure 1:
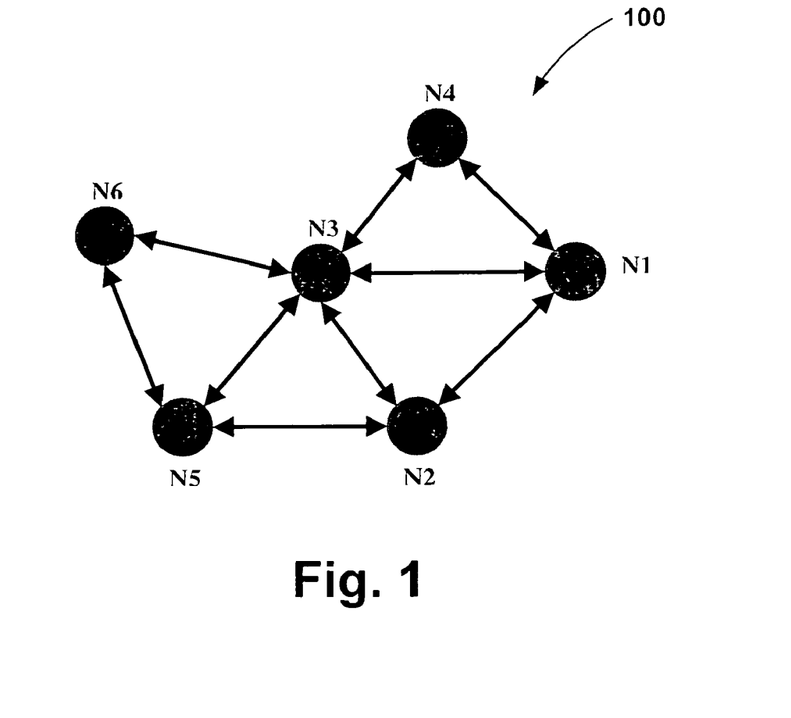
FIGS. 1 and 2 are block diagrams illustrating various arrangements for wireless mesh network according to various embodiments of the present invention.

Turning to FIG. 1, a wireless communication network 100 according to various inventive embodiments may be any system having devices capable of transmitting and/or receiving information via over-the-air (OTA) radio frequency (RF) links. For example in one embodiment, network 100 may include wireless nodes N1-N6 (also referred to herein as mesh points) to communicate or relay messages as a mesh network. In certain embodiments, nodes N1-N6 may be devices compatible with protocols from one or more of the Institute of Electrical and Electronics Engineers (IEEE) various 802 wireless standards including for example, 802.11 (a), (b), (g) and/or (n) standards for WLANs, 802.15 standards for WPANs, and/or 802.16 standards for WMANs, although the inventive embodiments are not limited in this respect.

Using existing 802.11 medium access control (MAC) specifications, a broadcast operation over a WLAN mesh network may be performed either by unicast-forwarding of the broadcast message or by broadcast-forwarding of the broadcast message. In unicast-forwarding the broadcast message will be unicasted to each neighbor individually and each neighbor in turn will forward the broadcast message to all its neighbors by doing multiple unicast transmissions until the message is eventually broadcasted to all nodes or mesh points.

In broadcast-forwarding the broadcast message may be broadcasted to all neighbors using a unique broadcast destination address (for example, a MAC address containing all 1s). Each neighbor node receiving such a message will also broadcast the message and so on until all mesh nodes have received the broadcast message.

Additional logic can be used to prevent each mesh node from forwarding/broadcasting the same broadcast message more than one time, for example, like caching all or part of a broadcast message or using a unique broadcast ID to identify different broadcast messages from the same source. However, even with the additional logic to prevent each mesh node from forwarding/broadcasting the same broadcast message more than once, significant transmission redundancy overhead still occurs when using either of these two methods, because all mesh nodes will transmit the broadcast message, when in fact, only a few mesh nodes are needed to get the message from point A to point B.

Conventionally, referring to the network topology of FIG. 1, in a unicast-forwarding broadcast, node N1 will transmit a MAC frame to N2, then another one to N3, and a third transmission to N4. When N1 makes the first transmission to N2, both N3 and N4 may hear the radio transmission but may ignore it since they are not addressed by this transmission. When any node receives the broadcast message it forwards the message individually to all its neighbors except the node it received the broadcast message from. Regardless of the sequence and order of transmissions, N2 will end up transmitting two times (e.g., once to N3 and once to N5), N3 four times (e.g., to N2, N4, N5 and N6), N4 one time, N5 two times, and N6 transmits 1 time. In this example, it is assumed that when a node receives a message with the same signature as a previously cached signature it discards the message to prevent the node forwarding the broadcast message twice.

Thus even conservatively, a total of 13 transmissions will occur to complete a unicast-forwarding broadcast operation originated by node N1.

In a broadcast-forwarding broadcast, using the same network topology of FIG. 1, node N1 will transmit a broadcast MAC frame that will be ideally received by all nodes within the radio coverage of node N1; for example, the broadcast MAC frame will be received by nodes N2, N3, and N4. Subsequently, each node, upon the reception of a broadcast MAC frame, rebroadcasts the MAC frame as long as its signature does not equal a previously cashed signature of previous broadcast MAC frames. Thus each node N1-N6 will transmit at least one broadcast MAC frame resulting in a minimum of 6 total transmissions to complete a broadcast-forwarding broadcast operation.

Ideally however, broadcast operation for the network in FIG. 1 would require a total of no more than two transmissions; e.g., one transmission by node N1 which may be received by nodes N2, N3, and N4, and another transmission by N3 which can be received by nodes N5 and N6. Thus it is clear that both conventional unicast-forwarding broadcast and broadcast-forwarding broadcast operations introduce significant transmission redundancy overhead to a wireless mesh network. Embodiments of the present invention related to methods and apparatuses that enable the broadcast operation in a wireless mesh network to be performed with more efficiency over a multi-hop mesh network.

For example, embodiments of the invention may provide for a more efficient layer-2 (i.e., data link layer) broadcast method for both data and control information across a multi-hop 802.11s (IEEE 802.11 Extended Service Set (ESS) Wireless Mesh PAR APP: May 13, 2004) WLAN mesh network, although the inventive embodiments are not limited in this respect. In one aspect, a higher efficiency may be achieved by significantly reducing the transmission redundancy overhead through the utilization of basic characteristics and behaviors of 802.11s mesh networks; namely the non-directional transmission patterns of current 802.11 transmitters, and the table of associated neighbors maintained by each node member of an 802.11s mesh network. This utilization may be accomplished using two key elements: (1) a MAC mechanism to transmit a MAC frame with one message body to multiple receivers; and (2) an algorithm for filtering out nodes which may likely have already received the message.

Embodiments of the present invention may utilize the principle of using a MAC frame with one message for multiple receivers while at the same time make each receiving node aware of who are the other nodes being addressed by this transmission. In certain embodiments, this may be achieved through the introduction of a modified MAC frame format which can contain multiple receiver addresses. By listing multiple receiver addresses instead of simply using a unique broadcast address the receiving nodes may gain valuable information about who is being addressed by the current MAC frame transmission as described in the example embodiments below.

Additionally, the aspect of using an algorithm for filtering neighbor nodes that have, most likely, already received the broadcast message can assist in reducing transmission overhead. Consequently, when the MAC addresses of a node's associated neighbors are known, and information about which nodes may have already received the current broadcast is included in the broadcast message itself, each node can optimize the handling of the broadcast message to reduce transmission redundancy as much as possible.

According to one example aspect of the invention a modified MAC frame format may be used as described below. However, it should be recognized that the inventive embodiments are not limited to any specific type or arrangement for frame or message formats, and the following discussion is merely one of many potential examples for implementing various embodiments.

Figure 3:
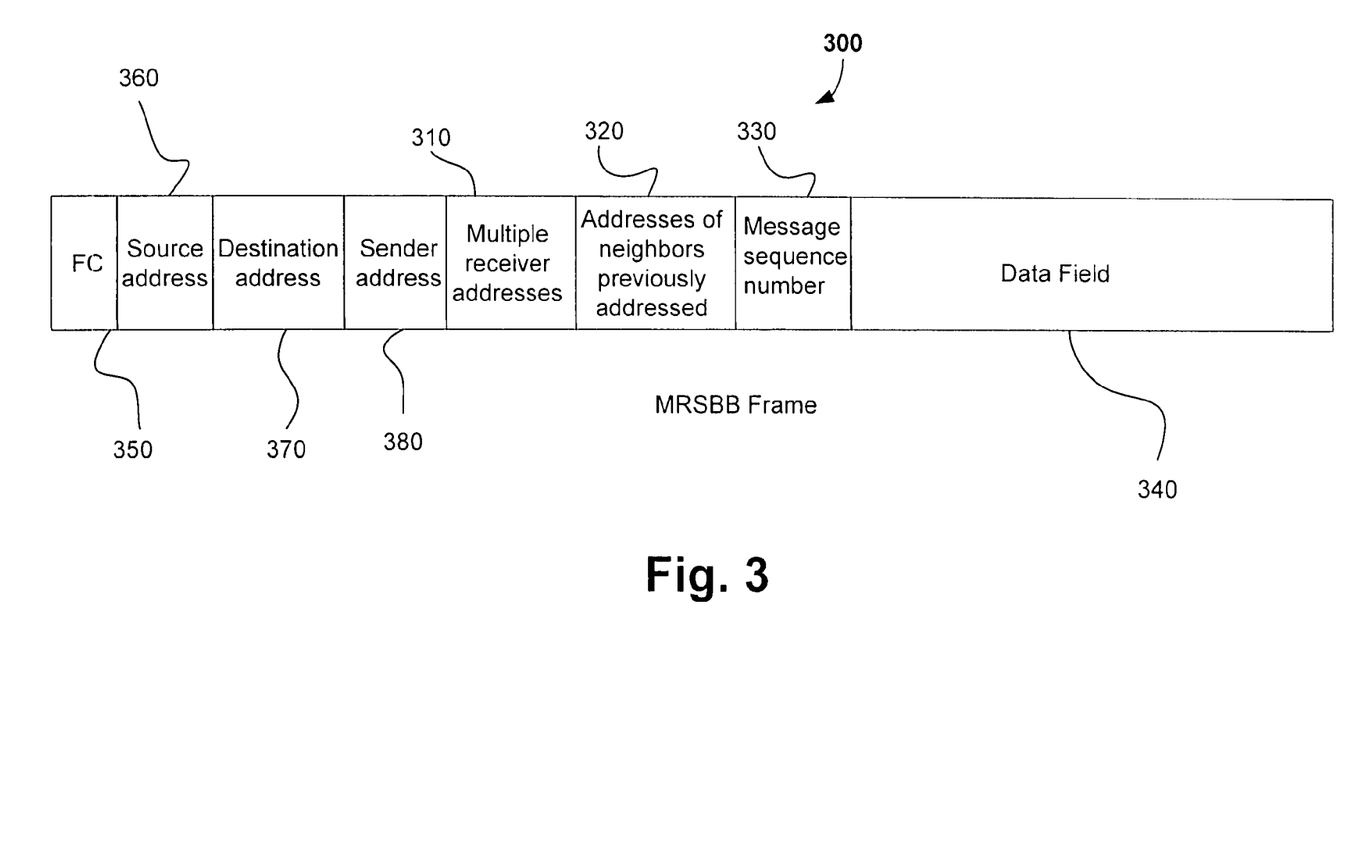
FIG. 3 is a diagram showing information which may be included in a message according to one or more embodiments of the present invention.

In this example, referring to FIG. 3, a MAC frame 300, referred to herein as a Multi-Receiver Single-Body Broadcast (MRSBB) frame may, for example, be an extended version of the IEEE 802.11-1999 four address format. Frame 300 may include a field 310 for multiple receiver addresses, a field 320 for addresses of neighbors previously addressed by other nodes, and a field 330 for a broadcast message sequence number although the embodiments are not limited in this respect. In one embodiment, the new type of MAC frame 300 can be identified by assigning a new specific subtype value in a Frame Control (FC) field 350 as defined in the MAC frame format in the 802.11-1999 specifications. It should be understood that the illustration in FIG. 3 is an oversimplified general representation of various potential information that may be present in frame 300, and the illustration is not intended to portray any actual order, size, inclusion or omission of frame elements.

In one example embodiment, frame 300 may also include a source address field 360, a destination address field 370 and a sender address field 380 if desired. According to one implementation, receiver address field 310 may be a variable length field for containing a list of MAC addresses for neighbor nodes to be addressed simultaneously by a single MAC frame transmission. Previously addressed neighbor field 320 may be a variable length field that contains MAC addresses of neighbor nodes that the transmitting node believes have already received transmission of the broadcast message. Message sequence number field 330 may include an integer value generated by the node originating the broadcast operation and incremented every time that particular source generates a new broadcast message. In one example implementation, a one byte field is reserved for the broadcast message sequence number value, although the inventive embodiments are not limited in this respect.

The message sequence number allows unique identification of different broadcast messages generated by the same source over a relatively long period of time. In this embodiment, destination address field 370 is not required, and thus may be omitted entirely if desired, as the message format is primarily targeted for layer-2 broadcasting. However, for purposes of utilizing legacy compatible devices, field 370 may be included and assigned a value of no significance. Alternatively, a value placed in field 370 could be used to signify that the frame is MRSBB frame or some other indication if desired. Various format arrangements and/or alterations may be recognized by the skilled artisan and the inventive embodiments are not limited to any particular frame or message format.

Figure 4:
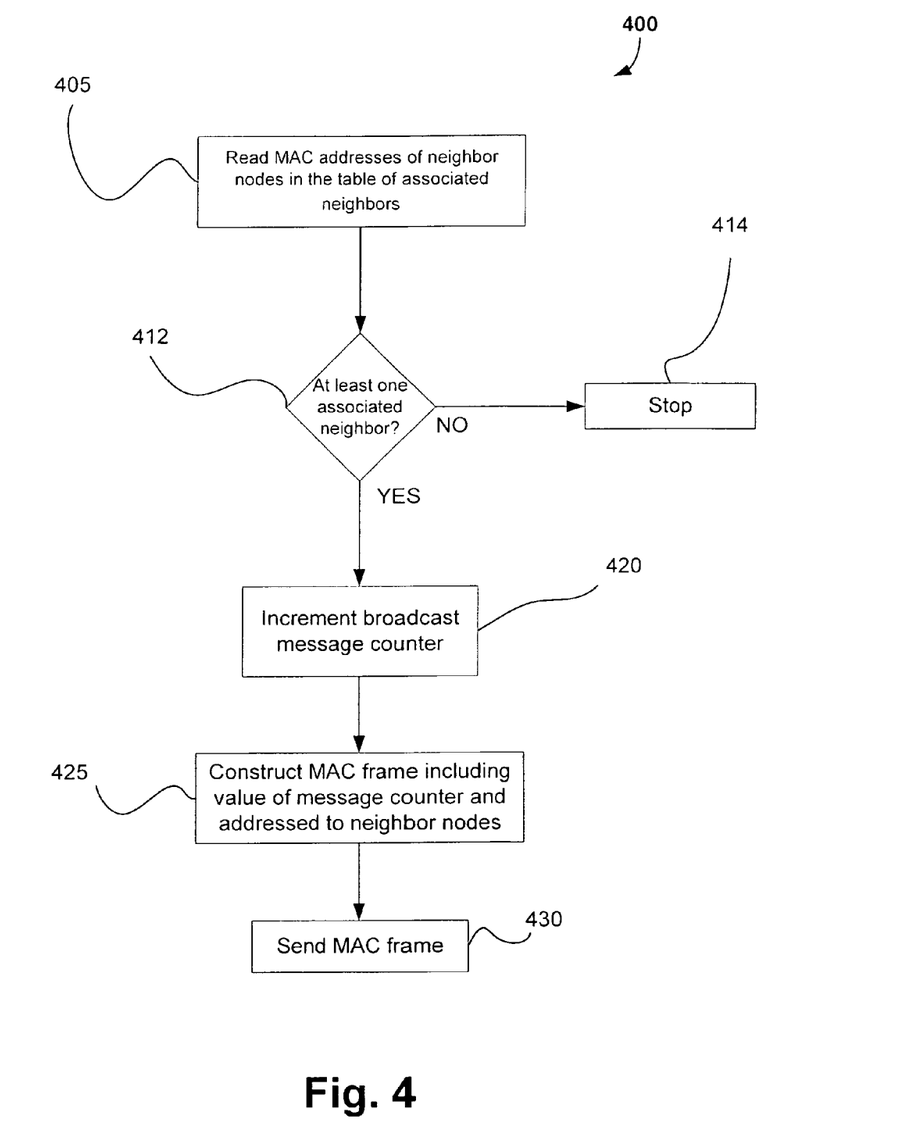
FIG. 4 is a flow diagram showing a process of generating a broadcast message according to one embodiment of the present invention.
Figure 5:
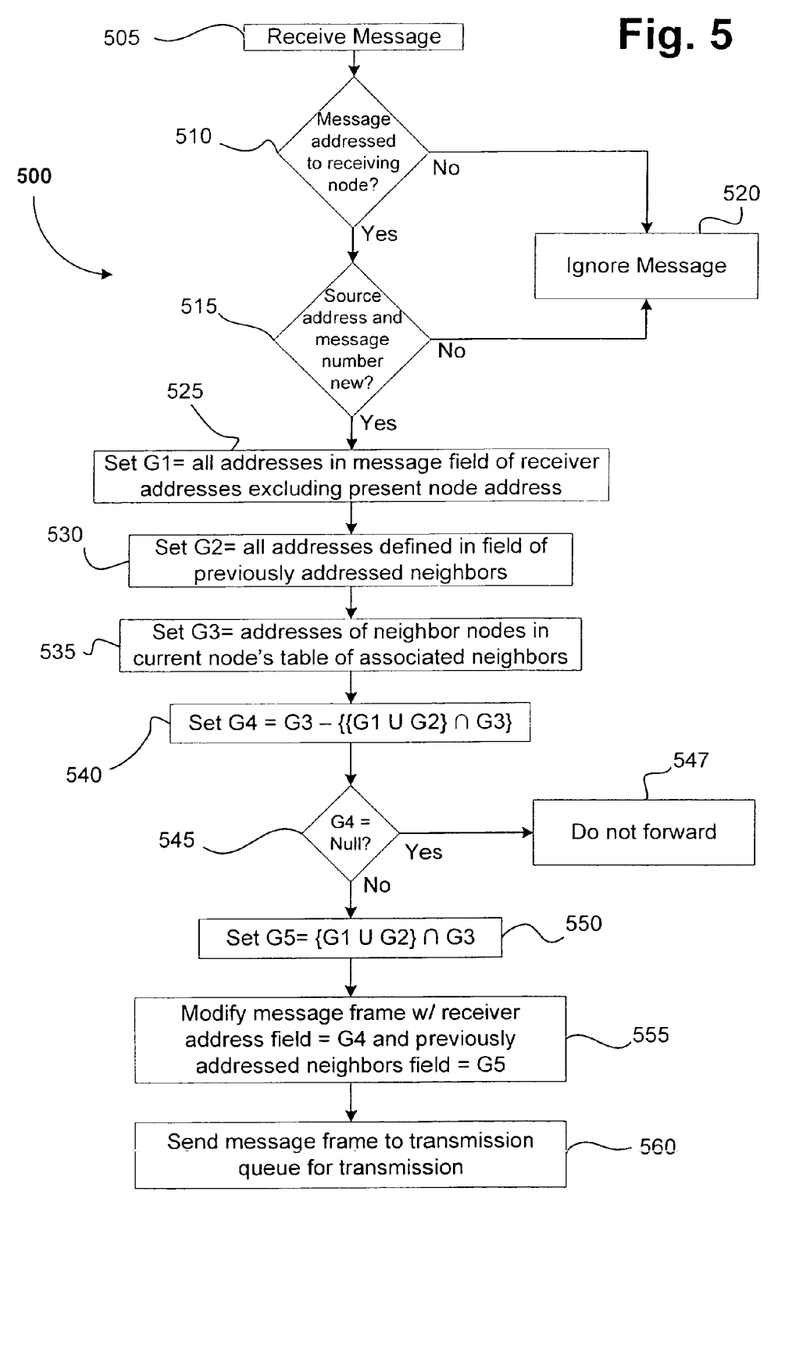
FIG. 5 is a flow diagram showing a process of a wireless node receiving a message and, if applicable, forwarding the message according to various embodiments of the present invention.

Referring to FIGS. 4 and 5, there are two basic processes according to the inventive embodiments including (i) a process 400 (FIG. 4) for a wireless mesh node to originate and initiate transmission of a multi-receiver broadcast message; and (ii) a process 500 (FIG. 5) where a mesh node receives and determines what to do with a received broadcast message.

A process 400 for originating a broadcast message according to one or more of the inventive embodiments may generally include reading 405 the MAC address of neighbor nodes, incrementing a broadcast message counter 412, constructing 425 a MAC frame including the addresses of neighbor nodes and the value of the message counter and sending 430 the constructed frame for broadcast to other mesh nodes.

Reading 405 MAC addresses of neighbor nodes may be performed using a table of associated neighbor nodes stored locally at the mesh node. If there are no associated neighbor nodes 412, a different form of transmission may be used or the process stopped 414. In this example, each mesh node may maintain a local counter for use as a broadcast message sequence number (e.g., 330; FIG. 3) which is incremented 420 and used each time a new message is generated by the mesh node. The message counter could alternatively be incremented after frame construction 425 or sending 430 of the frame. The timing or sequence of counter increment is not important so long as the message counter is incremented once for each new message originated by the respective mesh node.

Constructing 425 the MAC frame may include assembling a frame having fields similar to that discussed in respect to FIG. 3. For example, in one embodiment, a source address is set to be the MAC address of the current mesh node originating the message, the destination address, if present, may be set to a unique value (e.g., an address of all 1's) which may identify the type of broadcast operation or the frame format being used, the sender address field may be set as the MAC address of the current mesh node, the receiver addresses field may be set to include the MAC addresses all neighbor nodes read 205 from the table of associated neighbor nodes and, at this point (i.e., message origination), the field for previously addressed neighbor nodes can be left empty. Frame construction 425 may also include including the current value of the message counter and the data to be sent in the message body. When the frame construction is complete, it may be forwarded 430 for physical (PHY) layer processing and subsequent transmission over the air.

Turning to FIG. 5, a process 500 for handling broadcasts generated in accordance with method 400 of FIG. 4, may generally include receiving 505 a communication at a wireless mesh node, and if applicable, addressing 555 the communication to one or more neighboring wireless devices, excluding any neighboring devices previously addressed, and forwarding 560 the communication.

Upon receiving 505 a communication, MAC logic at the receiving mesh node may determine that the communication has a MRSBB MAC frame format, for example, by an indication in the FC field or other indication. At this point the receiving mesh node may expect there to potentially be more than one receiver address in the designated portion of the MAC frame (e.g., field 310; FIG. 3) and searches 510 for its own MAC address in this field. If it finds its own address the mesh node may continue processing the frame, otherwise it may ignore 520 and/or discard the received frame.

In one implementation, the receiving mesh node may then determine 515 whether it has previously received this same communication from another device. For example, the node may compare a signature (e.g., source address and broadcast message sequence number) of the received MAC frame with previously cached signatures of MAC frames and if a match is found the message may be discarded 520.

The mesh node may temporarily store 525 any MAC addresses (G1) listed as receiver addresses in the received frame other than its own address as well as store 530 the MAC addresses (G2), if any, in the field of previously addressed neighbor nodes. The mesh node may retrieve 535 the MAC addresses (G3) of all defined neighbor nodes in its own table of associated neighbors and revise 540 the receiver addresses to include MAC addresses to be neighbor nodes of the receiving node but exclude neighbor nodes which may likely have already received the message.

For example, in one non-limiting embodiment, the mesh node may compile a list of MAC addresses (G 4) to forward the message to using the following formula or similar formula:

$$G4=G3-\{\{G1\cup G2\}\cap G3\}$$

where ∩ is an intersection operation between G3 and the union (∪) of G1 and G2. (A ∪ B means the set that contains all the elements from A and also all those from B, but no others; and A ∩ B means the set that contains all those elements that A and B have in common).

If no MAC addresses remain 545 after performing this operation, the node knows not to forward 547 the frame as there is apparently no neighbor nodes remaining to forward the communication to which have not likely received it already.

However, if one or more MAC addresses (G4) do remain after this operation, in one embodiment, the mesh node may construct 455 a new MRSBB MAC frame with the same data field (or modify the fields of the existing frame) where the field for receiver addresses is set to be the remaining MAC addresses G4. The field including MAC addresses of previously addressed neighbor nodes may also be updated 455 to include MAC address (G5) resulting from an operation 450 performed using the following algorithm:

$$G5=\{G1\cup G2\}\cap G3$$

In modifying 450 or creating the new frame, the source address, destination address, broadcast message sequence value and message body may remain unchanged while the sender address may be set to be the MAC address of the current mesh node. The mesh node may then send 460 the MRSBB MAC frame, for example by forwarding the MAC frame to a queue for PHY processing and subsequent transmission as suitably desired.

Using embodiments described above and referring back to the example network in FIG. 1, N1 may transmit one MRSBB MAC frame that will include the addresses of N2, N3, and N4 as receiver addresses. Ultimately, two scenarios are possible:

In a first scenario N2 receives the MRSBB MAC frame from N1, recognizes that its address is included in the field of receiver addresses, modifies the receiver addresses as described above and ends up forwarding an MRSBB MAC frame (before N3 does) with the receiver address of node N5 only and addresses of nodes N1 and N3 as previously addressed neighbor nodes. Nodes N1 and N3 will discard/ignore the transmitted MRSBB frame from node N2 since their addresses are not included in the field of receiver addresses.

N5 will end up transmitting an MRSBB MAC frame with a receiver address of node N6 only, and addresses of N2 and N3 as previously addressed neighbor nodes. N6 will not retransmit the frame because there are no remaining neighbor nodes which haven't likely already received the frame. N2 and N3 will discard the transmitted MRSBB frame from node N5 since their addresses are not included in the field of receiver addresses.

N3, based on the decision it took at the time it received the MRSBB MAC frame from N1, would still, at some point in time, forward a MRSBB MAC frame with the receiver addresses of N5 and N6, and list addresses of nodes N1, N2, and N4 as neighbors previously addressed by other nodes. Nodes N5, and N6 will end up discarding the transmitted MRSBB frame from node N3 because they have previously received a message having the same signature. Nodes, N1, N2, and N4 will discard the frame since their addresses are not included in the field of receiver addresses. Note that whether N3 forwards before or after N5, N6 will end up deciding not to forward the frame due to no neighboring addresses remaining.

Thus based on scenario 1, which is a worst case scenario, the network in FIG. 1 ends up generating a total of 4 transmissions to complete a broadcast operation initiated by node N1.

In the second scenario N3 receives the MRSBB MAC frame from N1, recognizes that its address is included in the field of receiver addresses, re-addresses the fields and ends up forwarding a MRSBB MAC frame, before N2, with receiver addresses of nodes N5 and N6, and with the previously addressed neighbor field including N1, N2, and N4 addresses. Nodes N1, N2, and N4 will therefore discard the transmitted MRSBB frame from node N3 since their addresses are not included in the field of receiver addresses.

Nodes N5 and N6 will both end up deciding not to forward the MRSBB MAC frame based on there being no remaining neighbor nodes. N2, based on the decision it took at the time it received the MRSBB MAC frame from N1, would still, at some point in time, forward an MRSBB MAC frame with the receiver address of N5, and the addresses of N1, and N3 as previously addressed neighbors. Nodes N1, and N3 will ignore the frame from node N2 since their addresses are not included in the field of receiver addresses. Node N5 will also discard the transmitted MRSBB frame from N2 because it already received a frame having the same signature.

Thus based on second scenario, the network in FIG. 1 ends up generating a total of three transmissions to complete a broadcast operation initiated by node N1, where ideally it would only take two transmissions.

Figure 2:
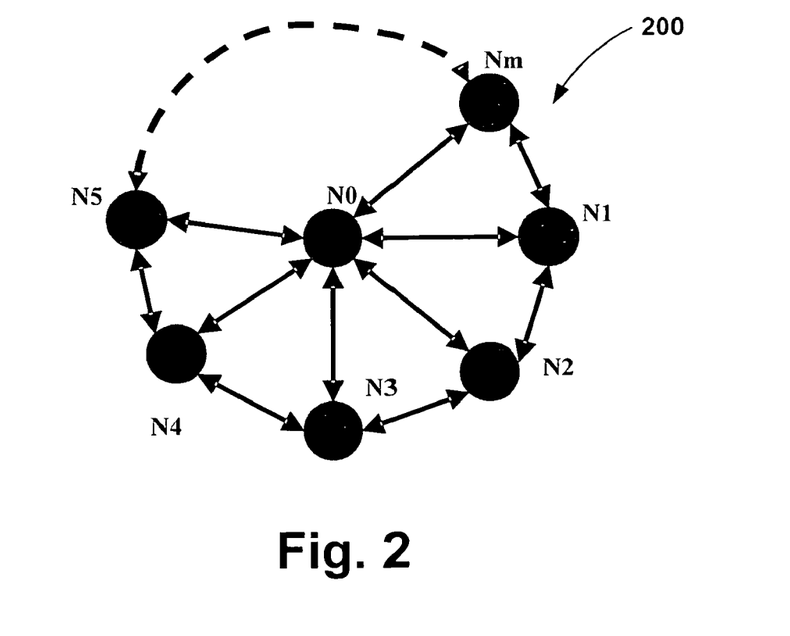

FIG. 2 shows a generic network based on star-topology made of (m+1) nodes and has similar results using the various inventive embodiments. Assume the central node (N0) is required to initiate a broadcast to all nodes in the network, using current 802.11 specifications, either a total of (m+1) transmissions will be required to complete the broadcast operation using broadcast-forwarding broadcast, or a total of (3 m) transmissions will be required to broadcast to the whole network using unicast-forwarding broadcast. However, by using the inventive embodiments of the present invention, only one transmission of one MRSBB MAC frame will be required to flood the network in FIG. 2. Consequently, in this generic example, and assuming no retransmissions, the inventive embodiments outperforms conventional broadcast-forwarding broadcast methods by a factor of approximately (m+1), and outperforms the conventional unicast-forwarding broadcast methods by a factor of approximately 3 m.

Thus far, embodiments have been described assuming no retransmissions and no MAC acknowledgments (ACK) of transmitted MAC frames. This is a valid scenario, particularly when node members of a WLAN mesh network need to broadcast periodic control information such as routing-related control information to all nodes members of the network.

However, there are cases when a node needs to broadcast data messages to all members of a WLAN mesh network and where confirmation of delivery is required. In these cases, a node transmitting an MRSBB MAC frame may wait for acknowledgments from all neighbor nodes by following a technique similar to those of Multiple Receiver Aggregate (MRA) techniques, which schedule the transmission of ACKs from all receiving nodes.

In this case, the MRSBB MAC frame may be adapted to include all fields necessary for the MRA MAC frame format. The transmitting node may be requesting and scheduling ACKs from all neighbor nodes whose addresses are in the list of receiver addresses field in the MRSBB MAC frame. If the transmitting node receives ACKs from all neighbor nodes that were asked to acknowledge, this marks the success of transmitting/forwarding an MRSBB MAC frame. If no ACKs or only a subset of ACKs were received by the transmitting node, the node may retransmit the MRSBB MAC frame using only the addresses of the unacknowledged receivers.

A fundamental difference between an MRSBB MAC frame and an MRA MAC frame (as proposed in the IEEE 802.11 TGn Synch proposal) is that the MRSBB frame contains one data field, while an MRA frame contains multiple MAC protocol data units (MPDUS) (e.g., one to many MPDUs per receiver). Additionally, the MRA MAC frame is primarily designed for one-hop communications and not for multi-hop wireless mesh networks.

Figure 6:
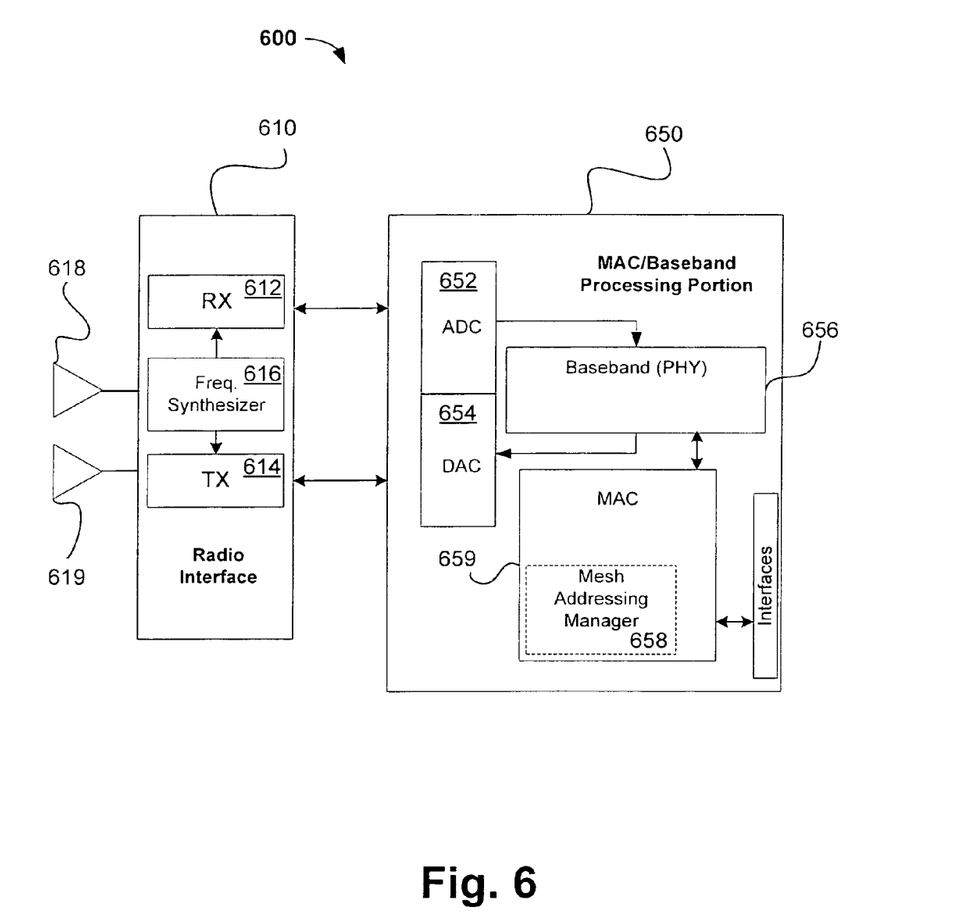
FIG. 6 is a block diagram showing an example wireless apparatus according to various aspects of the invention.

Referring to FIG. 6, an apparatus 600 for use in a wireless network may include a processing circuit 650 including logic (e.g., circuitry, processor(s) and software, or combination thereof) to generate and handle mesh broadcasts as described in one or more of the processes above. In certain embodiments, apparatus 600 may generally include a radio frequency (RF) interface 610 and a baseband and MAC processor portion 650.

In one example embodiment, RF interface 610 may be any component or combination of components adapted to send and receive modulated signals (e.g., OFDM) although the inventive embodiments are not limited to any particular modulation scheme. RF interface 610 may include, for example, a receiver 612, a transmitter 614 and a frequency synthesizer 616. Interface 610 may also include bias controls, a crystal oscillator and/or one or more antennas 618, 619 if desired. Furthermore, RF interface 610 may alternatively or additionally use external voltage-controlled oscillators (VCOs), surface acoustic wave filters, intermediate frequency (IF) filters and/or radio frequency (RF) filters as desired. Various RF interface designs and their operation are known in the art and the description for configuration thereof is therefore omitted.

In some embodiments interface 610 may be configured to provide OTA link access which is compatible with one or more of the IEEE standards for WPANs, WLANs, WMANs or WWANs, although the embodiments are not limited in this respect.

Processing portion 650 may communicate/cooperate with RF interface 610 to process receive/transmit signals and may include, by way of example only, an analog-to-digital converter 652 for down converting received signals, a digital-to-analog converter 654 for up converting signals for transmission, and a baseband processor 656 for physical (PHY) link layer processing of respective receive/transmit signals. Processing portion 650 may also include or be comprised of a processing circuit 659 for MAC/data link layer processing.

In certain embodiments of the present invention, MAC circuit 659 may include a mesh addressing manager 658 which may function to control mesh node addressing and filtering as described previously. Alternatively or in addition, PHY circuit 656 may share processing for certain of these functions or perform these processes independent of MAC processor 659. MAC and PHY processing may also be integrated into a single circuit if desired.

Apparatus 600 may be, for example, a mobile station, a wireless base station or AP, wireless router and/or a network adaptor for electronic devices. Accordingly, the previously described functions and/or specific configurations of apparatus 600 could be included or omitted as suitably desired.

Embodiments of apparatus 600 may be implemented using single input single output (SISO) architectures. However, as shown in FIG. 6, certain implementations may use multiple input multiple output (MIMO) architectures having multiple antennas (e.g., 618, 619) for transmission and/or reception. Further, embodiments of the invention may utilize multi-carrier code division multiplexing (MC-CDMA) multi-carrier direct sequence code division multiplexing (MC-DS-CDMA) for OTA link access or any other existing or future arising modulation or multiplexing scheme compatible with the features of the inventive embodiments.

The components and features of apparatus 600 may be implemented using any combination of discrete circuitry, application specific integrated circuits (ASICs), logic gates and/or single chip architectures. Further, the features of apparatus 600 may be implemented using microcontrollers, programmable logic arrays and/or microprocessors or any combination of the foregoing where suitably appropriate (collectively or individually referred to as "logic").

It should be appreciated that the example apparatus 600 represents only one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Unless contrary to physical possibility, the inventors envision the methods described herein: (i) may be performed in any sequence and/or in any combination; and (ii) the components of respective embodiments may be combined in any manner.

Although there have been described example embodiments of this novel invention, many variations and modifications are possible without departing from the scope of the invention. Accordingly the inventive embodiments are not limited by the specific disclosure above, but rather should be limited only by the scope of the appended claims and their legal equivalents.

What is claimed is:

1. A method for communicating in a wireless mesh network, the method comprising:
   receiving a communication at a first device over a wireless medium from a second device;
   addressing the communication to one or more neighboring wireless devices, excluding neighboring devices that were addressed in one or more fields of the communication by the second device by setting a variable length receiver address field to include a list of medium access control (MAC) addresses for neighbor nodes to be addressed simultaneously by a single MAC frame transmission and omitting from the list all MAC addresses of neighboring devices addressed in a variable length previously addressed neighbor field; and
   forwarding the communication.

2. The method of claim 1 further comprising determining whether the received communication had been previously received, and if so, ignoring the received communication.

3. The method of claim 1 wherein the MAC addresses of neighbor nodes in the receiver address field are defined in a table of associated neighbors stored by the first device less any MAC address of neighbor nodes previously addressed in the received communication.

4. The method of claim 1 wherein addressing the communication comprises setting a previously addressed neighbor node field to include MAC addresses addressed by the first device and MAC addresses addressed by the second device.

5. The method of claim 1 wherein addressing the communication comprises setting a sender address as a medium access control (MAC) address of the first device.

6. The method of claim 1 wherein the wireless mesh network comprises one of a wireless local area network (WLAN), a wireless personal area network (WPAN) or a wireless metropolitan area network (WMAN).

7. The method of claim 1 wherein the communication further comprises a medium access control (MAC) frame including a message sequence number field and a separate data field.

8. A method of communicating in a wireless network, the method comprising:
   originating a message by a mesh node to broadcast in the wireless network, the message including a multiple receiver address field, a previously addressed neighbor field a data field and a message sequence number field, wherein the multiple receiver address field is constructed by including known neighbor node addresses to forward the message to and omitting all neighbor node addresses present in the previously addressed neighbor field from the multiple receiver address field.

9. The method of claim 8 wherein the message comprises a medium access control (MAC) frame further including a source address field, a sender address field and the data field, and wherein originating the message comprises including a MAC address of the originating mesh node in the source address field and the sender address field and including MAC address of any neighbor nodes from a local table of neighbor nodes less all MAC address identified in the previously addressed neighbor field, in the multiple receiver address field.

10. The method of claim 8 wherein the wireless network comprises a wireless local area network (WLAN).

11. The method of claim 8 wherein the mesh node inserts a value of a counter in the message sequence number field and increments the value of the counter.

12. A wireless device comprising:
   a processing circuit including logic to process a received message having a multiple receiver address field, a previously addressed neighbor field and a data field to forward data in the data field to neighboring wireless nodes having addresses identified in a locally stored table, wherein the logic compares addresses in the previously addressed neighbor field with those in the locally stored table to forward the data only to those neighboring wireless nodes not listed in the previously addressed neighbor field.

13. The wireless device of claim 12 wherein the received message comprises a medium access control (MAC) frame including at least the multiple receiver address field, a message sequence number and the previously addressed neighbor field.

14. The wireless device of claim 13 wherein the logic comprises a medium access control (MAC) circuit to construct a broadcast message having a same source address and body of the received message but include in the multiple receiver address field of the broadcast message, MAC addresses of known neighbor nodes less any same MAC addresses from the previously addressed neighbor field of the received message.

15. The wireless device of claim 12 wherein the processing circuit further includes logic to include addresses from the receiver address field of the received message in the previously addressed neighbor field of the message to be forwarded.

16. The wireless device of claim 12 wherein the device comprises a mobile station in a wireless local area network (WLAN).

17. The wireless device of claim 14 wherein the device further comprises a physical (PHY) layer circuit to modulate the broadcast message.

18. A wireless system comprising:
   a processing circuit to process a received message having a multiple receiver address field, a previously addressed neighbor field adjacent the multiple receiver address field and a data field and construct a broadcast message forwarding the same data field and addressed to known neighboring wireless mesh nodes excluding all nodes whose addresses appear in the previously addressed neighbor field of the received message;
   a radio frequency (RF) interface communicatively coupled to the processing circuit; and
   at least two antennas coupled to the RF interface for at least one of multiple input or multiple output communication.

19. The system of claim 18 wherein the processing circuit constructs the broadcast message to include an updated previously addressed neighbor field using addresses from the multiple receiver address field and the previously addressed neighbor field of the received message and addresses of neighboring wireless mesh nodes stored local to the system.

20. The system of claim 18 wherein the received message and broadcast message comprise respective medium access control (MAC) frames having a same source address and data.

* * * * *